United States Patent [19]
Piller

[11] 3,787,215
[45] Jan. 22, 1974

[54] PHOTOGRAPHIC MATERIAL WITH BLEACHABLE DYE

[76] Inventor: Bernhard Piller, Marly-le-Petit, Switzerland

[22] Filed: Jan. 27, 1972

[21] Appl. No.: 221,429

Related U.S. Application Data

[63] Continuation-in-part of Ser. No. 46,453, June 15, 1970, abandoned, which is a continuation-in-part of Ser. No. 734,205, June 4, 1968, abandoned.

[30] Foreign Application Priority Data
June 7, 1967  Switzerland.......................... 8065/67
Jan. 18, 1968  Switzerland.......................... 757/68

[52] U.S. Cl. ............................................... 96/99
[51] Int. Cl. .............................................. G03c 1/10
[58] Field of Search ................................. 96/99

[56] References Cited
UNITED STATES PATENTS

| | | | |
|---|---|---|---|
| 3,264,109 | 8/1966 | Anderau et al. | 96/99 |
| 2,294,892 | 9/1942 | Carroll et al. | 96/99 |
| 3,322,543 | 5/1967 | Anderau et al. | 96/99 |
| 3,443,953 | 5/1969 | Loeffel et al. | 96/99 |

FOREIGN PATENTS OR APPLICATIONS
682,665  11/1952  Great Britain ........................ 96/99

*Primary Examiner*—J. Travis Brown
*Assistant Examiner*—Richard L. Schilling
*Attorney, Agent, or Firm*—Joseph G. Kolodny et al.

[57] ABSTRACT

Photographic, light-sensitive material is provided which contains on a support at least one silver halide layer and at least one layer containing a dyestuff of the formula

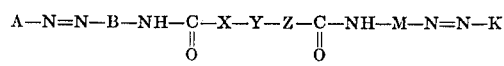

wherein A, K, B, M, X and Z each denotes an aromatic residue, the residues A—N=N—B—NH—CO— and K—N=N—M—NH—CO contain groups which confer solubility in water, and Y denotes a water solubility imparting bridging group consisting of at most 4 members.

Above all this photographic material is suitable for the silver dyestuff bleaching process and the dyestuffs are incorporated therein mainly as yellow, magenta or cyan image dyestuffs.

13 Claims, No Drawings

PHOTOGRAPHIC MATERIAL WITH BLEACHABLE DYE

This application is a continuation-in-part of our co-pending patent application Ser. No. 46,453 filed on June 15, 1970, now abandoned, which in its turn is a continuation-in-part of our patent application Ser. No. 734,205 filed on June 4, 1968, now abandoned.

This invention provides disazo dyestuffs of formula (1) 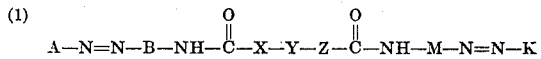

wherein A, K, B, M, X and Z each denotes an aromatic residue, the residues A—N=N—B—NH—CO— and K—N=N—M—NH—CO— contain groups which confer solubility in water, and Y denotes a water solubility imparting bridging group consisting of at most four members.

(4) 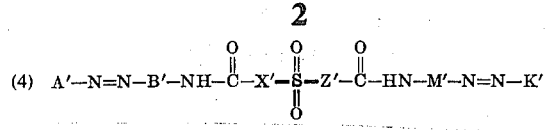

wherein A' and K' each denotes an aromatic residue containing 1 to 3 acidic groups which confer solubility in water, B' and M' each denotes an aromatic residue and X' and Z' each denotes a monocyclic benzene residue.

These dyestuffs may be of unsymmetrical structure or especially of symmetrical structure. They contain at least in the terminal residues A' and K' acidic groups which confer solubility in water, for example carboxylic acid groups or especially sulphonic acid groups.

Depending on their composition, the dyestuffs of formulae (1) to (4) absorb in the most diverse wavelength ranges. Dyestuffs which as a rule are yellow preferably correspond to the formula (5) 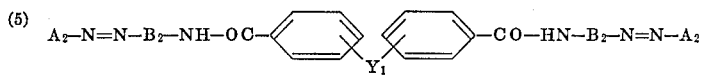

Disazo dyestuffs of especial interest contain the residue $Y_1$ as the water solubility imparting bridge member which corresponds to one of the formulae $$-(CH_2)_n-, -CO-, -NH-, -O-, -S-, -S-S- \text{ and } -SO_2-,$$

wherein n denotes an integer having a value of at most 4. The invention also includes the metal complexes of dyestuffs of formula (1). Particularly valuable disazo dyestuffs are those of formula (2) 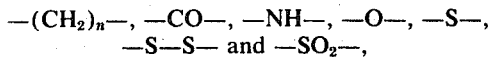

wherein $A_1$ and $K_1$ each denotes a benzene or naphthalene residue, $B_1$ and $M_1$ each denotes a benzene, diphenyl or naphthalene residue, the residues $A_1$ and $K_1$ contain 1 to 3 acidic groups which confer solubility in water and/or the residues $B_1$ and $M_1$ contain 1 or 2 acidic groups which confer solubility in water, and $Y_1$ has the significance mentioned above.

The invention also includes symmetrical disazo dyestuffs, namely dyestuffs of formula (3) 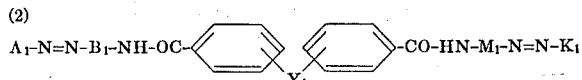

wherein $A_1$, $B_1$ and $Y_1$ have the significance mentioned above and wherein the residue $A_1$ contains 1 to 3 acidic groups which confer solubility in water and/or the residue $B_1$ contains 1 or 2 acidic groups which confer solubility in water.

In particular, good disazo dyestuffs also contain the water solubility imparting residue $Y_2$, which corresponds to one of the residues —CH₂—, —NH—, —S—, —S—S— or —SO₂— as a bridge member.

Amongst the dyestuffs of formulae (1) to (3), those having a —SO₂— group as a bridge member are of particular interest. They preferably correspond to the formula wherein $A_2$ denotes a phenyl or naphthyl residue which contains 1 to 3 sulphonic acid groups and may be substituted by alkyl, alkoxy or nitro groups or halogen atoms, $B_2$ denotes a phenylene residue which may be substituted by at most two alkyl, alkoxy, hydroxyalkoxy, alkoxyalkoxy, acylamino, carboxylalkyl, carboxy or phenoxy groups or halogen atoms or a naphthylene residue which is substituted by an alkyl or alkoxy group and/or at most two sulphonic acid groups, and $Y_1$ has the significance above mentioned.

Amongst the symmetrical disazo dyestuffs, dyestuffs of formula (6) 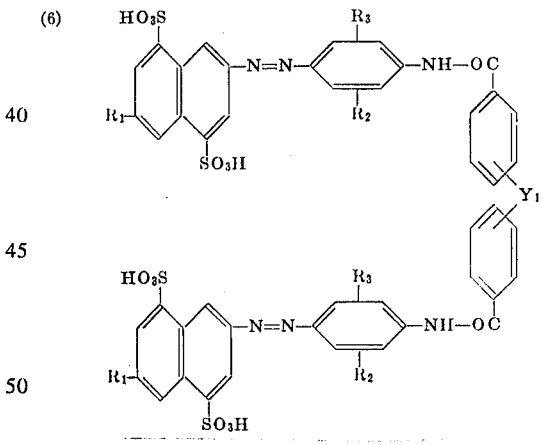

are to be mentioned, wherein $R_1$ represents a hydrogen atom, a nitro group, a halogen atom or a sulphonic acid group, $R_2$ represents a hydrogen atom, a halogen atom, an alkyl, alkoxy, hydroxyalkoxy or alkoxyalkoxy group having in each case 1 to 5 carbon atoms in the alkyl residue, a phenoxy group, a hydroxyacetic acid residue, an acetic acid residue or an acylamino group, in which acyl represents the residue of an aliphatic carboxylic acid having 1 to 5 carbon atoms or a benzene-, pyridine-, furane- or thiophene-carboxylic acid which may be substituted, $R_3$ denotes a hydrogen atom or an alkyl, alkoxy or acylamino group, in which acyl has the significance above mentioned, and $Y_1$ also has the significance above mentioned.

Of the dyestuffs of formula (5), those should especially be mentioned when $Y_1$ is $Y_2$ which has the significance indicated above, or above all a water solubility imparting residue $Y_3$ which represents a $-SO_2-$, $-CH_2-$, $-S-$ or $-S-S-$ group as a bridge member.

Preferred yellow dyestuffs correspond to the formula

(10)
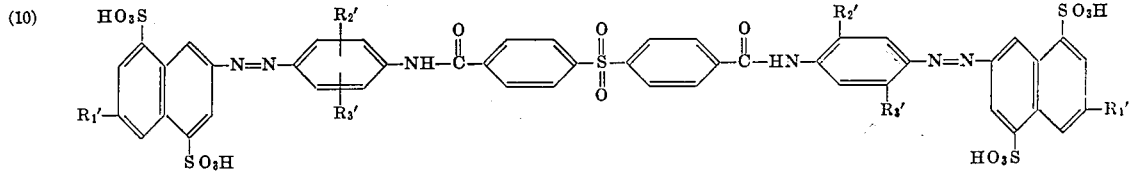

are particularly valuable. In formula (9) $R_1'$ denotes a hydrogen atom, a nitro group, a sulphonic acid group or optionally a halogen atom, $R_2'$ denotes a hydrogen atom, a halogen atom, an alkyl, alkoxy, hydroxyalkoxy, alkoxyalkoxy or acylamino group, and $R_3'$ denotes a hydrogen atom, an alkyl group, an alkoxy group or an acylamino group. Here, the disazo dyestuffs of formula wherein $R_1'$, $R_2'$ and $R_3'$ have the significance above mentioned, for example the dyestuffs of formula

(11)
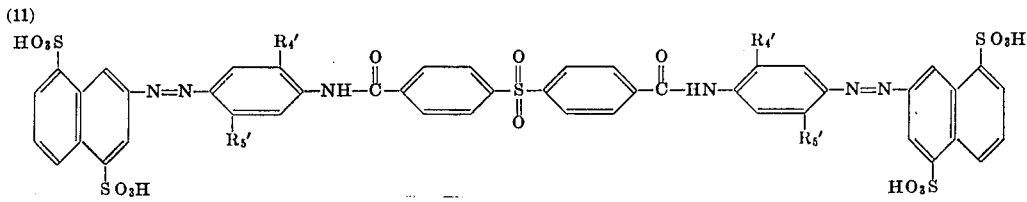

(7)
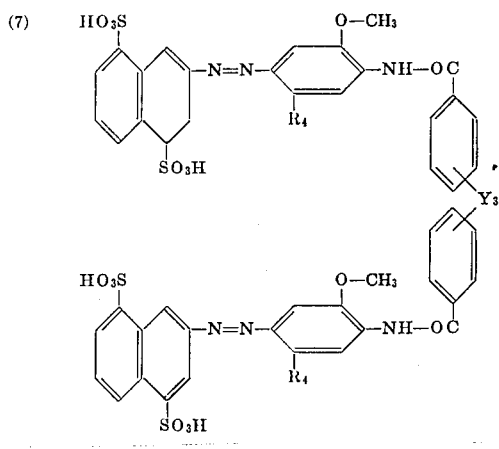

wherein $R_4$ denotes a chlorine atom, a methyl, methoxy or acetylamino group, and $Y_3$ denotes a residue of formula $-SO_2-$, $-CH_2-$, $-S-$ or $-S-S-$.

The disazo dyestuffs of formula (8)
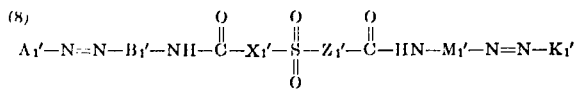

wherein $A_1'$ and $K_1'$ each denotes a monocyclic benzene residue or a naphthalene residue which is free from hydroxyl groups and contains 1 to 3 acidic groups which confer solubility in water, $B_1'$ and $M_1'$ each denotes a monocyclic benzene residue bound in the p-position to the azo group and the $-NH-$ group, and $X_1'$ and $Z_1'$ each denotes a monocyclic benzene residue, are as a rule particularly suitable yellow dyestuffs. Amongst these, the dyestuffs of formula wherein $R_4'$ and $R_5'$ each denotes an alkoxy or acylamino group, are preferred.

When $R_2'$ represents an alkyl or alkoxy group, this group is advantageously one containing 1 or 2 carbon atoms. Halogen atoms $R_2'$ are preferably chlorine atoms. When acylamino groups are present as substituents $R_2'$ and/or $R_3'$, these are for example derived from low molecular weight fatty acids having 1 to 5 carbon atoms, and indeed carbon-containing substituents $R_2'$ and $R_3'$ also generally appropriately contain at most 5 carbon atoms.

The residues A, K, $A_1$, $K_1$, $A_2$, A', K', $A_1'$ and $K_1'$ in yellow dyestuffs of formulae (1) to (11) are for example derived from the following amines: 2-aminonaphthalene-4, 8-disulphonic acid, 2-amino-6-nitronaphthalene-4, 8-disulphonic acid, 2-amino-6-chloronaphthalene-4,8-disulphonic acid, 2-aminonaphthalene-5,7-disulphonic acid, 1-aminonaphthalene-3,6-disulphonic acid, 2-aminonaphthalene-4,6,8-trisulphonic acid, 1-aminobenzene-3,5-dicarboxylic acid, 1-aminobenzene-2-sulphonic acid and 1-aminobenzene-2,5-disulphonic acid.

The residues B, M, $B_1$, $M_1$, $B_2$, B', M', $B_1'$ and $M_1'$ of formulae (1) to (11) are for example derived from the following amines: aminobenzene, 1-amino-2-methylbenzene or 1-amino-3-methylbenzene, 1-amino-2, 5-dimethylbenzene or 1-amino-2, 6-dimethylbenzene, 1-amino-2-methoxybenzene or 1-amino-3-methoxybenzene, 1-amino-2-ethoxybenzene, 1-amino-2-$\beta$-hydroxyethoxybenzene, 1-amino-2-$\beta$-methoxyethoxy-5-methylbenzene, 1-amino-3-acetylaminobenzene, 1-amino-3-n-butyrylaminobenzene, 1-amino-3-propionylaminobenzene, 1-amino-3-iso-butyrylaminobenzene, 1-amino-3-acetylamino-6-

(9)
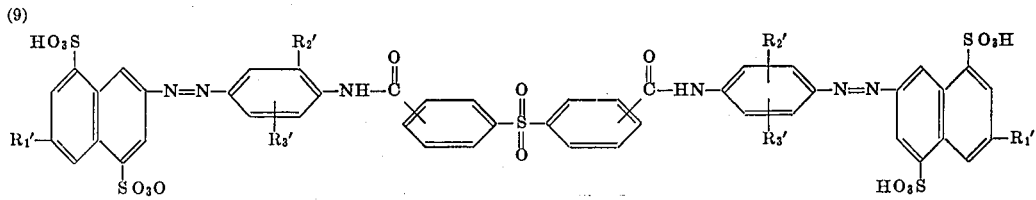

methyl-benzene, 1-amino-3-propionylamino-6-methylbenzene, 1-amino-3(3'-carboxy)-propionylaminobenzene, 1-amino-3-n-butyrylamino-6-methylbenzene, 1-amino-3-isobutyrylamino-6-methylbenzene, 1-amino-2-acetylamino-5-methylbenzene, 1-amino-2-propionyl-amino-5-methylbenzene, 1-amino-2-n-butyrylamino-5-methylbenzene, 1-amino-2-isobutyrylamino-5-methylbenzene, 1-amino-2-methyl-5-methoxylbenzene, 1-amino-3-chlorobenzene, 1-amino-2-chloro-5-methoxybenzene, 1-amino-2-methoxy-5-chlorobenzene, 1-amino-2,5-dimethoxybenzene, 1-amino-2,5-diethoxybenzene, 1-amino-2,5-diacetylaminobenzene, 1-aminonaphthalene, 2-aminonaphthalene-7-sulphonic acid, 1-aminobenzene-2-methyl-hydroxyacetic acid, 1-amino-2-methoxy-5-phenoxybenzene, and the residues B, M, $B_1$, $M_1$ and $B_2$ may also be derived from N-3-amino-4-methylphenylurea.

Dyestuffs which as a rule yield red or magenta shades preferably correspond to the formula

(12)
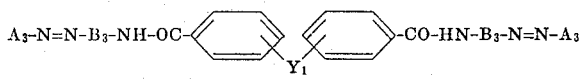

wherein $A_3$ denotes a naphthalene residue which contains at least one hydroxyl group and/or a residue of formula

(13)

wherein $U_1$ represents a hydrogen atom, an alkyl, phenyl, alkylphenyl, acyl, hydroxyalkyl or cycloalkyl residue and $U_2$ represents a hydrogen atom or an alkyl or hydroxyalkyl residue, $B_3$ denotes a benzene, naphthalene or diphenyl residue which may contain a halogen atom or an alkyl or alkoxy residue, the residues $A_3$ and $B_3$ together contain 1 to 3 sulphonic acid groups of which one may be replaced by a sulphonic acid amide group, and $Y_1$ has the significance mentioned above.

(14)
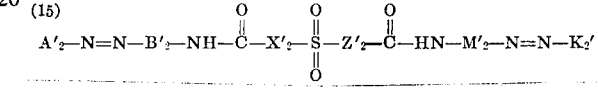

wherein $A_4$ denotes a naphthalene residue containing 1 or 2 sulphonic acid groups of which one may be replaced by a sulphonic acid amide group and 1 or 2 hydroxyl groups and/or a residue of formula —NH—$U_3$, wherein $U_3$ represents a hydrogen atom or an alkyl, phenyl or acyl residue, $B_4$ denotes a benzene or diphenyl residue which may contain a halogen atom, a sulphonic acid group, or an alkyl or alkoxy group containing 1 to 5 carbon atoms in each case, and $Y_1$ has the significance above mentioned.

Particular interest attaches to dyestuffs of formula (12) which contain the residue $Y_2$ which has the significance above mentioned, or especially the residue $Y_3$ which represents a —$SO_2$—, —$CH_2$—, —$S$— or —$S$—$S$— residue as a bridge member.

Valuable dyestuffs are above all those of formula

(15)
$$A'_2-N=N-B'_2-NH-\overset{O}{\underset{}{C}}-X'_2-\overset{O}{\underset{\overset{\|}{O}}{S}}-Z'_2-\overset{O}{\underset{}{C}}-HN-M'_2-N=N-K_2'$$

which in general yield magenta shades. In this formula $A_2'$ and $K_2'$ each denotes a naphthalene residue which in the 1-position is bound to the azo group, in the 2-position contains an amino group, in the 8-position contains a hydroxyl group and additionally 1 or 2 sulphonic acid groups, and $B_2'$, $M_2'$, $X_2'$ and $Z_2'$ each denotes a monocyclic benzene residue. The amino group in the 2-position may be primary, secondary, for example a monoalkylamino or monophenylamino group, or tertiary, for example a dialkylamino group. The monocyclic benzene residues, especially $B_2'$ and $M_2'$ may have further substituents, for example halogen atoms for example chlorine, alkyl groups for example ethyl or methyl, alkoxy groups for example ethoxy or methoxy or sulphonic acid groups.

Particular significance attaches to the magenta dyestuffs of formula

(16)
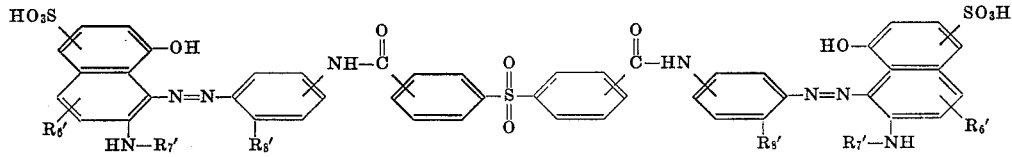

thalene or diphenyl residue which may contain a halogen atom or an alkyl or alkoxy residue, the residues $A_3$ and $B_3$ together contain 1 to 3 sulphonic acid groups of which one may be replaced by a sulphonic acid amide group, and $Y_1$ has the significance mentioned above.

(17)
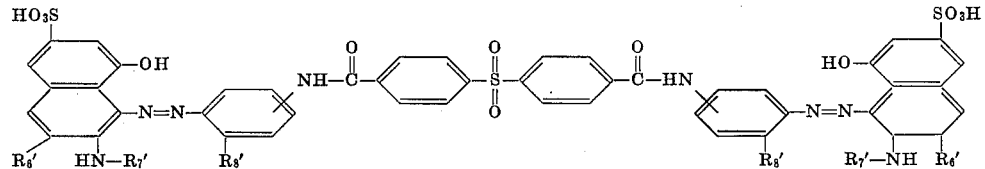

Amongst these are to be mentioned magenta dyestuffs of formula wherein $R_6'$ denotes a hydrogen atom or a sulphonic acid group, $R_7'$ denotes a hydrogen atom, an alkyl group or a benzene residue and $R_8'$ denotes a hydrogen atom, a halogen atom, an alkyl group or a sulphonic acid group. Here the disazo dyestuffs of formula wherein $R_6'$, $R_7'$ and $R_8'$ have the significance mentioned above, are preferred, especially those of formula

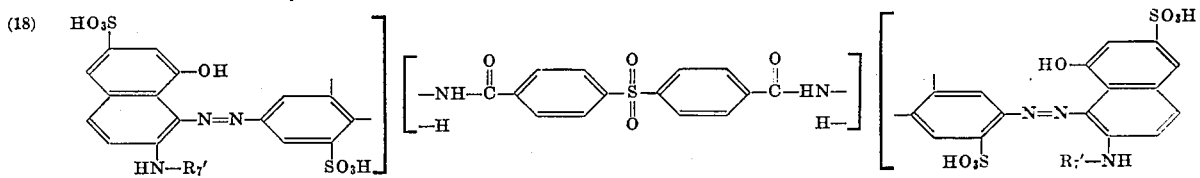

for example the dyestuffs of formulae

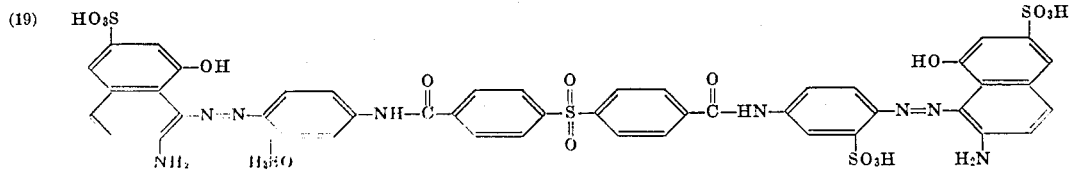

and

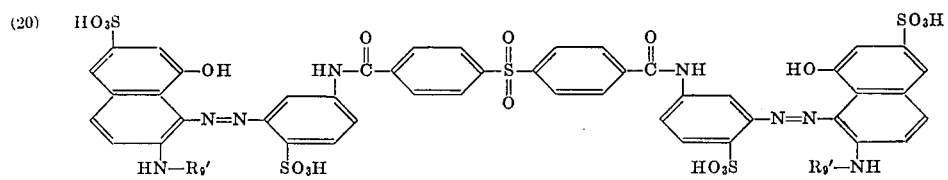

wherein $R_9'$ denotes a group of formulae

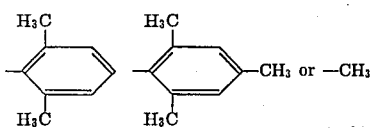

The residues A, K, $A_1$, $K_1$, A', K', $A_2'$, $K_2'$, $A_3$ and $A_4$ in the magenta dyestuffs of formulae (1) to (4) and (12) to (20) are for example derived from the following coupling components: 2-amino-8-hydroxynaphthalene-6-sulphonic acid, 2-(2'-methylphenylamino)-8-hydroxynaphthalene-6-sulphonic acid, 2-(2',6'-dimethylphenylamino)-8-hydroxynaphthalene-6-sulphonic acid, 2-(2',6'-diethylphenylamino)-8-hydroxynaphthalene-6-sulphonic acid, 2-(2',4',6'-trimethylphenylamino)-8-hydroxynaphthalene-6-sulphonic acid, 2-(2',3',4',6'-tetramethylphenylamino)-8-hydroxynaphthalene-6-sulphonic acid, 2-dimethylamino-8-hydroxynaphthalene-6-sulphonic acid, 2-diethylamino-8-hydroxynaphthalene-6-sulphonic acid, 2-β-hydroxyethylamino-8-hydroxynaphthalene-6-sulphonic acid, 2-n-butylamino-8-hydroxynaphthalene-6-sulphonic acid, 2-cyclohexylamino-8-hydroxynaphthalene-6-sulphonic acid, 2-(2',6'-dimethylphenylamino)-8-hydroxynaphthalene-3,6-disulphonic acid, 2-methylamino-8-hydroxynaphthalene-6-sulphonic acid, 2-amino-8-hydroxynaphthalene- 3,6- or -5,7-disulphonic acid, 2-amino-8-hydroxynaphthalene- 7-sulphonic acid-5-sulphonamide, 2-amino-8-hydroxynaphthalene-5-sulphonic acid, 2-di-(β-hydroxyethylamino)-8-hydroxynaphthalene-6-sulphonic acid, 1-amino-8-hydroxynaphthalene-2,6-disulphonic acid, 1-amino-8-hydroxynaphthalene-3,6-disulphonic acid, 1-amino-8-hydroxynaphthalene-4,6-disulphonic acid, 1-amino-8-hydroxy-naphthalene-2,5-disulphonic acid, 1-amino-8-hydroxynaphthalene-4-sulphonic acid, 1-amino-5-hydroxynaphthalene-7-sulphonic acid, 2-amino-5-hydroxynaphthalene-7-sulphonic acid, 2-aminonaphthalene-6-sulphonic acid, 2-hydroxynaphthalene-4- or -6- or -7-sulphonic acid, 2-hydroxynaphthalene-3, 6- or 6,8-disulphonic acid, 1,-7-dihydroxynaphthalene-3,6-disulphonic acid and 1,8-dihydroxynaphthalene-3,6-disulphonic acid.

In the case of the aminonaphthalenes, the corresponding acyl derivatives can also be used.

The residues B, M, $B_1$, $M_1$, B', M', $B_2'$, $M_2'$, $B_3$ and $B_4$ in the magenta dyestuffs of formulae (1) to (4) and (12) to (20) are for example derived from the following diazo components containing nitro groups: 1-amino-4-nitrobenzene-2-sulphonic acid, 1-amino-5-nitrobenzene-2-sulphonic acid, 1-amino-4-nitrobenzene, 1-amino-2-methyl-4-nitrobenzene, 1-amino-2-methoxy-4-nitrobenzene and 1-amino-2-chloro-4-nitrobenzene. Instead of these diazo components benziding-3-sulphonic acid for example may also be used.

Particularly suitable combinations of $A_3$ and $B_3$ are for example provided by the residues of formula

(21) $A_3 - N = N - B_3 - NH - CO -$ :

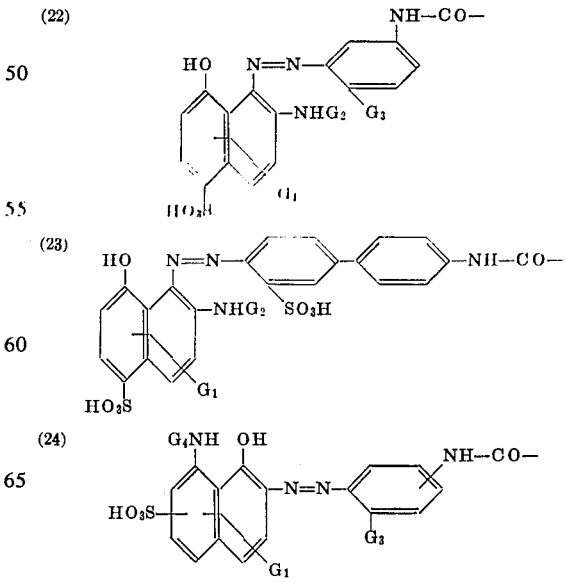

(25) 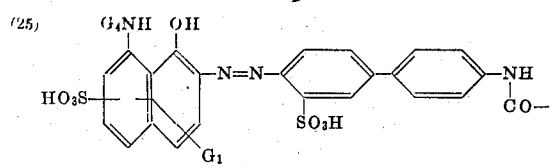
(26) 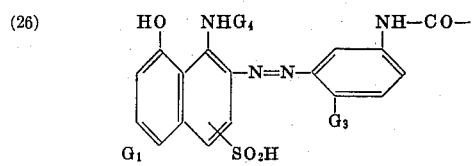
(27) 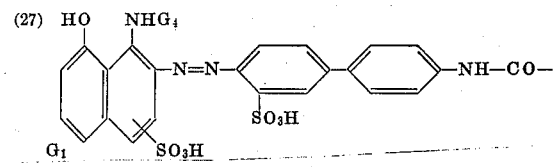
(28) 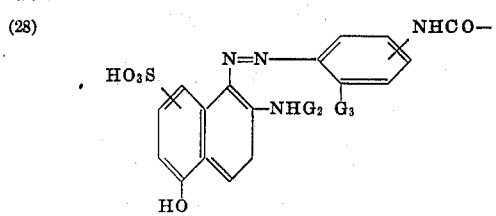
(29) 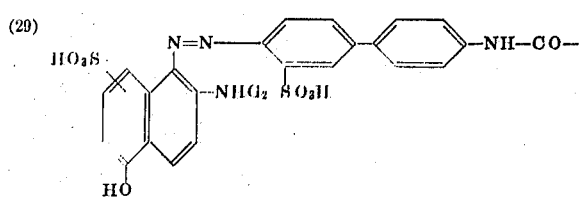
(30) 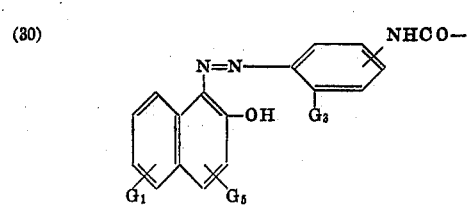
(31) 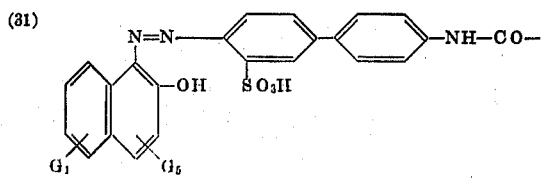
(32) 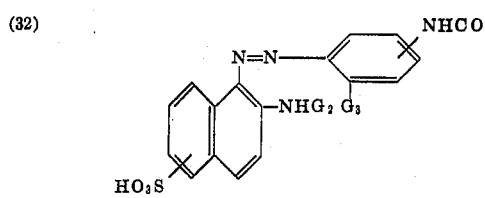
(33) 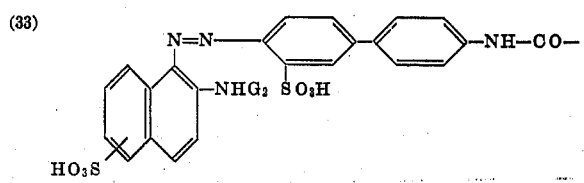

In formulae (22) to (33) $G_1$ and $G_5$ denote a hydrogen atom or a sulphonic acid group, $G_2$ denotes a hydrogen atom or an alkyl or benzene residue, $G_3$ denotes a hydrogen atom, a halogen atom, an alkyl or alkoxy residue or a sulphonic acid group and $G_4$ denotes a hydrogen atom or an acyl residue.

Other magenta dyestuffs of formula (3) have $A_3$—N=N—$B_3$—NH—CO— residues which correspond to the following formulae:

(34) 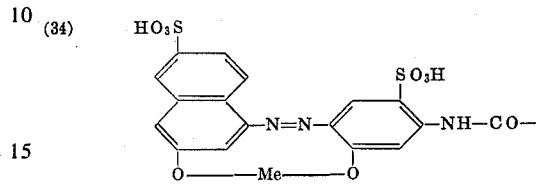

(35) 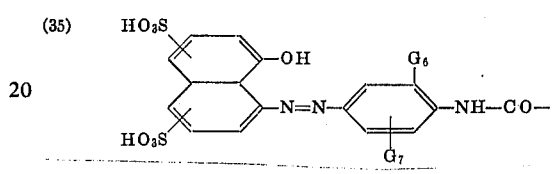

In formula (34) Me denotes a copper or chromium atom, that is to say the disazo dyestuffs in question may also in part be metal complexes, preferably copper complexes, $G_6$ denotes a hydrogen atom, an alkyl, alkoxy or acylamino residue or a halogen atom, and $G_7$ denotes a hydrogen atom or an alkyl, alkoxy or acylamino residue.

Blue or bluish-green dyestuffs of formula (1) as a rule preferably correspond to the formula

(36) 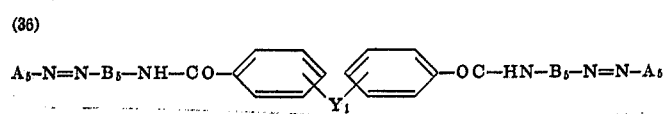

wherein $A_5$ denotes a naphthalene residue which contains 1 or 2 sulphonic acid groups, at least one hydroxyl group and a residue of formula —O—$U_4$ or —NH—$U_5$, in which $U_4$ represents a hydrogen atom, an alkyl or aralkyl group and $U_5$ a hydrogen atom, an alkyl, hydroxyalkyl, phenyl or acyl residue, $B_5$ denotes a benzene residue which contains at least one alkyl, alkoxy or acylamino residue or a naphthalene residue which contains 1 or 2 sulphonic acid residues and a hydroxyl group, and $Y_1$ has the significance above mentioned.

Amongst the bluish-green dyestuffs of formula (36) those are to be emphasised which contain as a bridge member the residue $Y_2$ which has the significance above mentioned or especially the residue $Y_3$ which represents a —$SO_2$—, —$CH_2$—, —S— or —S—S— residue.

The residues A, K, $A_1$, $K_1$ and $A_5$ of the bluish-green dyestuffs of formulae (1), (2), (3) and (36) are for example derived from 1-amino-8-hydroxynaphthalene-2,4— or 3,6— or —4,6-disulphonic acid.

The amino group present in the 1-position may be a primary amino group, or, especially in the case of the —3, 6— and the 4,6-disulphonic acid, also an amino group which is further substituted, for example a monoalkylamino or dialkylamino group for example monomethylamino or dimethylamino, monoethylamino or diethylamino, a β-hydroxyalkylamino group for example β-hydroxyethylamino, a phenylamino group or especially an acylamino group for example an acetylamino or propionylamino group. Amongst the acylamino groups those must be especially mentioned which contain a benzene nucleus which may be further substituted, for example benzoylamino, dichloro-benzoylamino and p-toluenesulphonylamino groups.

Furthermore the A- and K-residues of the bluish-green dyestuffs may also for example be derived from the following components: 1,8-dihydroxynaphthalene-3,6-disulphonic acid, 1-hydroxy-8-methoxynaphthalene-3,6-disulphonic acid, 1-hydroxy-8-benzyloxynaphthalene-3,6-disulphonic acid, 2-amino-8-hydroxynaphthalene-6-sulphonic acid, 2-amino-8-hydroxynapthalene-3,6-disulphonic acid and 2-acetylamino-5-hydroxynaphthalene-4,8-disulphonic acid.

In the case of bluish-green dyestuffs the residues B, M, $B_1$, $M_1$ and $B_5$ are for example derived from the following components: 1-amino-2-methoxy-5-methyl-4-nitrobenzene, 1-amino-2,5-dimethoxy-4-nitrobenzene, 1-amino-2,5-dimethoxy-4-nitrobenzene, 1-amino-2,5-diethoxy-4-nitrobenzene, 1-amino-2,5-dimethoxy-4-acetylaminobenzene, 1-amino-2-methoxy-4-acetylamino-5-phenoxybenzene, as well as 2-nitro-6-aminonaphthalene-4,8-disulphonic acid.

Suitable combinations of $A_5$ with $B_5$ for example lead to the following residues of formula $A_5$—N=N—$B_5$—NH—CO—, which represent bluish-green dyestuffs:

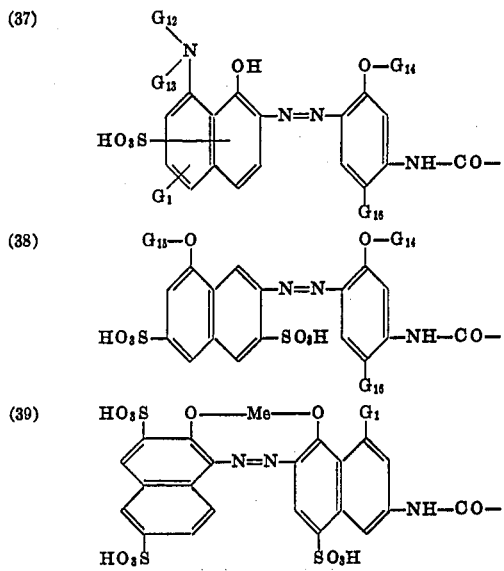

In formulae (37) to (39) $G_1$ denotes a hydrogen atom or a sulphonic acid group, $G_{12}$ and $G_{13}$ independently of one another each denotes a hydrogen atom or an alkyl, aryl or acyl residue, in which however $G_{12}$ only represents an acyl or aryl residue when $G_{13}$ denotes a hydrogen atom, $G_{14}$ denotes an alkyl residue, $G_{15}$ a hydrogen atom, an alkyl or aralkyl residue, $G_{16}$ a hydrogen atom, an alkyl or alkoxy residue, and Me a nickel atom or especially a copper atom. This means that the bluish-green dyestuffs of formula (1) can also in part be metal complexes.

Furthermore the residues A, K, X, Z and especially B and M in formula (1) may, apart from aromatic residues, also represent heterocyclic residues.

The yellow, magenta and bluish-green dyestuffs of formula (1) may be all manufactured according to the same processes. In one process compounds of formulae

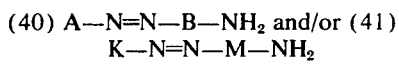

wherein A, B, K and M have the significance above mentioned, are condensed with dicarboxylic acid dihalides of formula

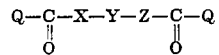

wherein Q denotes a halogen atom and X, Y and Z have the significance above mentioned. These dyestuffs may be converted into the metal complex compounds.

The condensation is effected according to known methods and is advantageously carried out in a polar solvent for example water or especially a polar organic solvent for example methanol, glycol, dimethylformamide, diethylacetamide or N-methylpyrrolidone. It is also advantageous to effect the condensation in the presence of acid-binding reagents for example tertiary amines or alkali metal carbonates. The condensation may also be carried out in solvents which themselves act as acid-binding reagents, for example pyridine or the N-methylpyrrolidone which has already been mentioned.

The conversion to the metal complex compounds is carried out according to known methods for example in baths containing copper sulphate.

The manufacture of the aminoazo dyestuffs of formulae (40) and (41) is also carried out according to known methods for example by combining a diazo compound of an amine of formula A—$NH_2$ or K—$NH_2$, wherein A and K have the significance above mentioned, advantageously in an acid medium, with a monoamine capable of coupling and having the formula H—B—$NH_2$ or H—M—$NH_2$, wherein B and M have the significance above mentioned. Another method for example consists of coupling diazo compounds of nitro compounds of formulae H—B—$NO_2$ or H—M—$NO_2$ with compounds of formula H—A—$NH_2$ or H—K—$NH_2$, wherein B, M, A and K have the significance above mentioned, in an acid medium and reducing the nitro group in the nitro-azo dyestuff thus obtained to an amino group.

The manufacture of the dicarboxylic acid dihalides of formula (42) may be carried out according to known methods.

Symmetrical dyestuffs of formula (4), and also mixtures which in addition to symmetrical dyestuffs contain a symmetrical dyestuffs of formula (4), may be manufactured by condensing in a molecular ratio of 2 : 1 aminomonoazo dyestuffs of formula

wherein A', B', K' and M' have the significance above mentioned, with dicarboxylic acid dihalides of formula

(45) 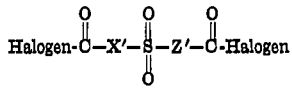

wherein X' and Z' have the significance above mentioned.

The disazo dyestuffs of formula (1) may be used for various purposes, for example in photographic materials, and are particularly advantageous as image dyestuffs for the silver colour bleaching process. Accordingly, valuable photographic materials which contain at least one layer having a dyestuff of formula (1) on a support, can be manufactured by known methods.

In particular, the disazo dyestuffs may be present in a multi-layer material which contains on a layer support, a layer coloured with a greenish-blue dyestuff which is selectively sensitive to red, above this a magenta coloured layer which is selectively sensitive to green, and finally a yellow-coloured layer which is selectively sensitive to blue.

At the same time, disazo dyestuffs of formula (1) may be used in only one layer or in two layers or in all three layers. Dyestuffs of formulae (1) to (4) may be employed in all three layers, whilst dyestuffs of formula (36) are only suitable for the layer which is sensitive to red, dyestuffs of formulae (12) and (20) are only suitable for the layer which is sensitive to green and dyestuffs of formulae (5) to (11) are only suitable for the layer which is sensitive to blue.

The dyestuffs of formula (1) may also be incorporated in an auxiliary layer or especially in a layer adjacent to a light-sensitive layer.

The dyestuffs of formula (1) are very resistant to diffusion in the usual layers. They do not tend to change into an opalescent to cloudy form in gelatine layers on drying and storage, and they can easily be reduced in a bleaching bath to give decomposition products which are harmless and/or easily washed out.

The dyestuffs of formula (1) are distinguished by high colour intensity and purity of shade. Grey shades which appear neutral to the eye over the whole density range can therefore be produced for example by means of combination of a yellow dyestuff of formula (6) with a suitable magenta dyestuff and a suitable greenish-blue dyestuff.

Compared with other disazo dyestuffs the dyestuffs of formula (1) are very especially distinguished by their good solubility and compatibility with cations, especially calcium ions.

In the examples which follow the parts denote parts by weight and the percentages denote percentages by weight unless otherwise stated. The relation of the parts by weight to the parts by volume is as that of g to ml.

EXAMPLE 1

0.75 parts of diphenylmethane (1,1')-3,3'-dicarboxylic acid dichloride are added in 10 minutes to a solution of 2.25 parts of the disodium salt of the monoazo dyestuff of formula

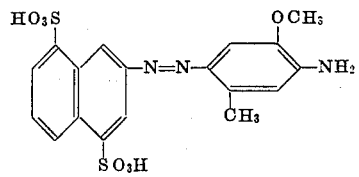

in 55 parts by volume of N-methyl-2-pyrrolidone. A similar addition is repeated four times at intervals of 1 hour, the mixture is filtered, the resulting dyestuff in the filtrate is precipitated by means of acetone and purified by reprecipitation from an aqueous solution by means of sodium acetate and acetone.
0.4 parts of dyestuff of formula (47) are obtained as a dark brown powder.

(47)
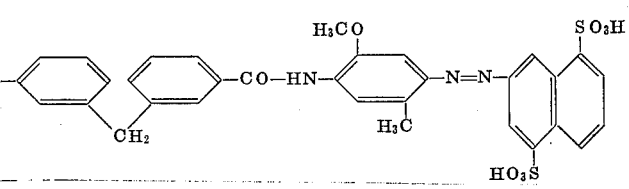

Absorption maximum in dimethylformamide-water mixture (1:1):400 nm.
Absorption maximum in gelatine:408 nm.

EXAMPLE 2

The procedure of example 1 is followed but instead of the monoazo dyestuff of formula (46) 2.2 parts of the disodium salt of the monoazo dyestuff of formula

(48)
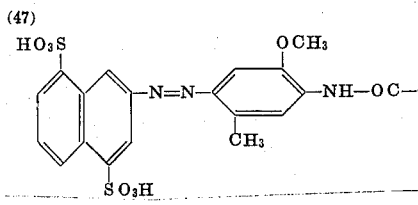

are used and 2 parts of dyestuff of formula (49) are obtained as a dark red powder.

(49)
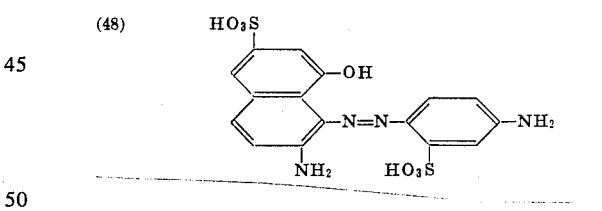

Absorption maximum in dimethylformamide-water mixture (1:1):519 nm.
Absorption maximum in gelatine:526 nm.
The dyestuffs of formulae (50 to (52) are obtained in an analogous manner.

| Formula number | Residue $A_1$—N=N—$B_1$—NH—OC—⟨⟩— according to formula (3) | Y | Absorption maximum in— DMF-$H_2O$(1:1) nm. | Gelatine. nm. |
|---|---|---|---|---|
| 50 | 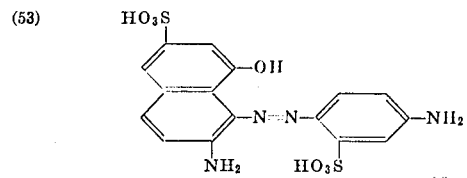 | —$CH_2$— | 512 | 568 |
| 51 | | —S— | 507 | 524 |
| 52 | | —S—S— | 512 | 527 |

EXAMPLE 3

21.9 parts of monoazo dyestuff of formula

(53) 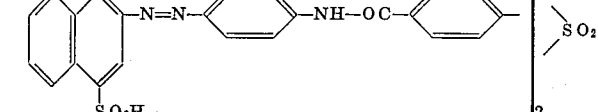

are dissolved in 500 parts by volume of N-methyl-2-pyrrolidone and 8.6 parts of diphenylsulphone-(1,1')-4,4'-dicarboxylic acid dichloride are added to the solution during 10 minutes. The mixture is stirred for 20 minutes at room temperature and the dyestuff is precipitated by adding 550 parts by volume of acetone. On reprecipitation from water by means of potassium acetate and, optionally, chromatographic purification, about 26 parts (90 percent) of pure dyestuff of formula (19) are obtained as a violet crystal powder. The absorption maximum in dimethylformamide-water mixture (1:1) is about 520 nm.

The dyestuffs of Table II can be manufactured in the same manner (the absorption maxima again apply to dimethylformamide-water, 1:1).

TABLE II

| Number | Formula | Absorption maximum, nm. |
|---|---|---|
| 54 | 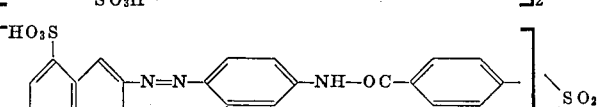 | 372 |
| 55 | | 376 |
| 56 | | 398 |
| 57 | | 392 |
| 58 | | 396 |
| 59 | | 394 |

TABLE II—Continued
| Number | Formula | Absorption maximum, nm |
|---|---|---|
| 60 | 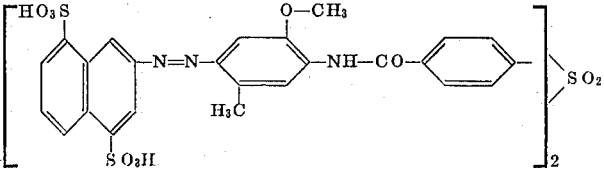 | 398 |
| 61 | 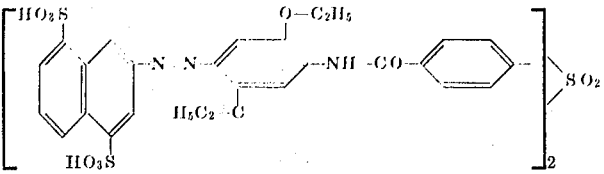 | 422 |
| 62 | 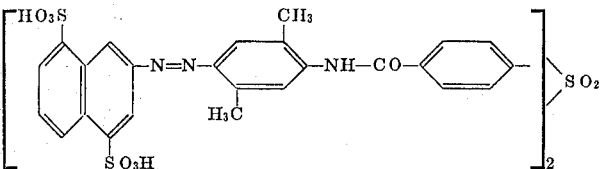 | 360 |
| 63 | 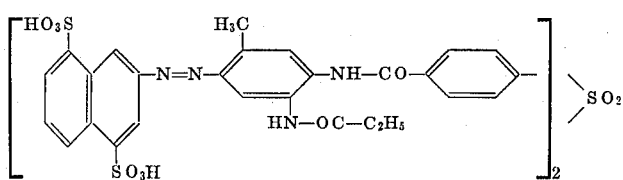 | 370 |
| 64 | 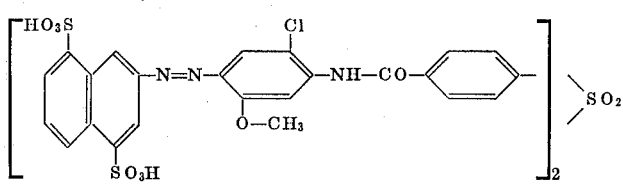 | 393 |
| 65 | 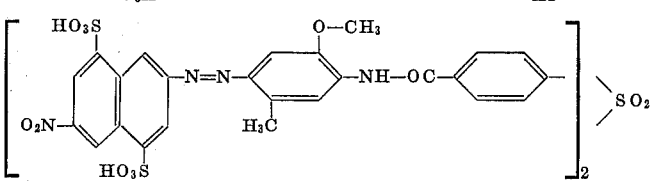 | 414 |
| 66 | 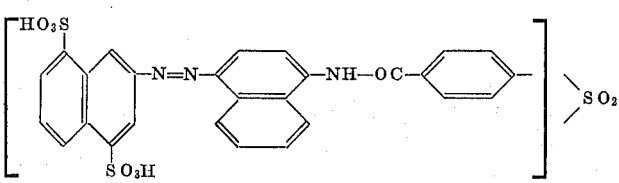 | 404 |
| 67 | 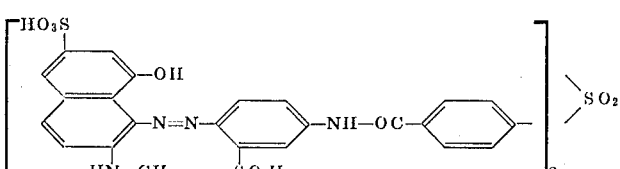 | 562 |
| 68 | 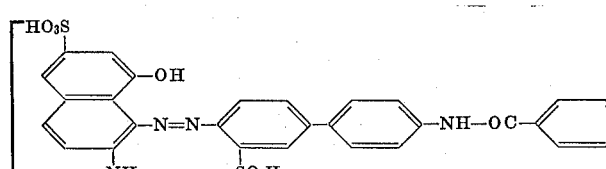 | 523 |

Table II—Continued

| Number | Formula | Absorption maximum, nm. |
|---|---|---|
| 69 | [structure: naphthalene with HO₃S, OH, NH₂, N=N linked to benzene with SO₃H and HN-OC-phenyl]₂ SO₂ | 510 |
| 70 | [structure: naphthalene with HO₃S, OH, HN-(2,4,6-trimethylphenyl), N=N linked to benzene with SO₃H and HN-OC-phenyl]₂ SO₂ | 522 |
| 71 | [structure: naphthalene with 2× HO₃S, OH, NH₂, N=N-phenyl-NH-CO-phenyl]₂ SO₂ | 506 |
| 72 | [structure: naphthalene with 2× HO₃S, OH, NH₂, N=N-phenyl(CH₃)-NH-CO-phenyl]₂ SO₂ | 514 |
| 73 | [structure: naphthalene with 2× HO₃S, OH, NH₂, N=N-phenyl(O-CH₃)-NH-CO-phenyl]₂ SO₂ | 524 |
| 74 | [structure: naphthalene with 2× HO₃S, OH, NH₂, N=N-phenyl(Cl)-NH-CO-phenyl]₂ SO₂ | 520 |
| 75 | [structure: naphthalene with SO₂-NH-phenyl, OH, HO₃S, SO₃H, N=N-phenyl(OCH₃)(CH₃O)-NH-CO-phenyl]₂ SO₂ | 582 |

EXAMPLE 4

0.7 ml of a 1 percent aqueous solution of the dyestuff No. 60 of Table II are added to 3.3 ml of a 6 percent aqueous gelatine at 40°C. 3.3 ml of a gelatine-silver bromide emulsion at 40°C are added thereto, and, optionally 1 to 2 ml of an aqueous solution of a spreading agent, for example saponin, and of a hardener, for example dimethylol urea. This mixture is cast onto a glass plate of 13 cm 18 cm, and is dried.

The material is then exposed to light behind a step wedge, and the silver image is developed in a 1-methyl-amino-4-hydroxybenzene sulphate hydroquinone developer and fixed.

The image dyestuff is bleached in a bath which contains in 1000 parts by volume, 30 to 100 parts by volume of 32 percent hydrochloric acid, 40 to 120 parts of potassium bromide, 30 to 50 parts of thiourea and 0.001 to 0.01 part of 2-amino-3-hydroxyphenazine, depending on the amount of silver present.

After an intermediate washing, the excess silver is removed in a bath which contains in 100 parts by volume, 100 parts of sodium chloride, 100 parts of crystalline copper sulphate and 50 parts by volume of 37 percent hydrochloric acid. The material is finally fixed in the usual manner. A yellow colour wedge is obtained, which represents an inverted image of the original silver wedge and which is completely bleached in the original areas of highest density of silver. Such a yellow image can also be part of a multi-colour material.

Similar results are obtained when instead of the dyestuff of formula (60) dyestuffs No. 54 to 66 of Table II are used.

EXAMPLE 5

The instructions of example 4 are followed, but instead of dyestuff No. 60 the dyestuff of formula (19) obtainable according to example 3 is used. A magenta image is thus obtained which can also be a component image of a multi-colour material. Magenta images can be produced in the same manner with dyestuffs Nos. 67 to 74 of Table II.

EXAMPLE 6

The following layers are successively applied to an opaque white acetate film provided with an adhesive layer:
1. A silver bromide emulsion in gelatine which is sensitive to red, and which contains the greenish-blue dyestuff of formula The gelatine layers may also contain additives for example wetting agents, hardeners and stabilisers for the silver halide. In other respects the procedure followed is that the individual layers contain for each square metre of film, 0.5 g of the particular dyestuff and an amount of silver bromide which corresponds to 1 to 1.2 g of silver.

This film is exposed to light under a coloured diapositive using red, green and blue copying light. Thereafter the copy is developed in accordance with the following instructions:
1. 6 minutes development in a bath which contains in a litre of water, 50 g of anhydrous sodium sulphite, 0.2 g of 1-phenyl-3-pyrazolidone, 6 g of hydroquinone, 35 g of annydrous sodium carbonate, 4 g of potassium bromide and 0.3 g of benztriazole;
2. 5 minutes washing;
3. 6 minutes fixing in a solution of 200 g of crystalline sodium thiosulphate and 20 g of potassium metabisulphite in 1 litre of water;
4. 5 minutes washing;
5. 3 to 12 minutes colour bleaching with an aqueous solution which contains 50 to 80 g of potassium bromide, 40 to 80 g of thiourea, 35 to 80 g of 30 percent sulphuric acid and, if desired, 0.001 to 0.01 g of 2-amino-3-hydroxyphenazine;
6. 10 minutes washing;

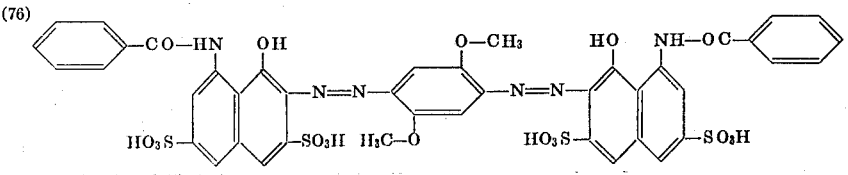

2. A colourless gelatine layer without silver halide.
3. A silver bromide emulsion in gelatine which is sensitive to green and which contains the magenta dyestuff of formula 7. 5 minutes bleaching of residual silver with a solution of 60 g of crystalline copper sulphate, 80 g of potassium bromide and 15 ml of 30 percent hydrochloric acid in one litre of water;

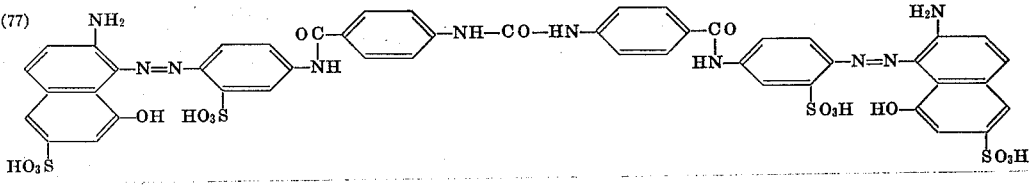

4. A yellow filter layer which contains the dyestuff of formula 8. 5 minutes washing;
9. 5 minutes fixing as specified under 3;
10. 5 minutes washing.

A light-stable document-fast positive image is obtained.

Similar good results are obtained when in place of the dyestuff of formula No. 58, the dyestuff of formula No. 47 is used.

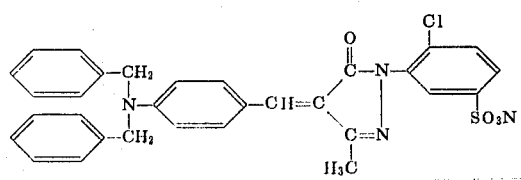

5. A silver bromide emulsion in gelatine which is sensitive to blue and which contains the yellow dyestuff No. 58 of Table II.

EXAMPLE 7

The procedure of example 6 is followed but using the magenta dyestuff No. (67) of Table II instead of the magenta dyestuff of formula (77), and using the yellow dyestuff of formula

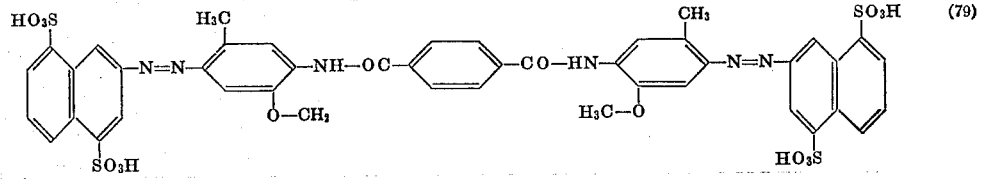

in place of the yellow dyestuff No. 58. A light-stable document-fast image is again obtained.

I claim:

1. Photographic, light-sensitive material which comprises on a support at least one silver halide layer and at least one layer containing a dyestuff of the formula

in which $A_1$ and $K_1$ each is phenyl, naphthyl, substituted phenyl or substituted naphthyl, the substituents being selected from halogen, alkyl, alkoxy, phenylalkoxy, nitro, sulfonyl, hydroxyl, sulfonamide and a group of the formula

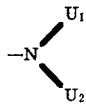

where $U_1$ is hydrogen, $C_1$—$C_5$ alkyl, phenyl, ($C_1$—$C_5$) alkyl phenyl, $C_1$—$C_5$ hydroxyalkyl, $C_5$—$C_6$ cycloalkyl, or acyl derived from an alkyl carboxylic acid containing 1–5 carbon atoms, benzene carboxylic acid, pyridine carboxylic acid, furane carboxylic acid, thiophene carboxylic acid, benzoylamino, dichloro-benzoylamino or p-toluene-sulfonylamino, $U_2$ is hydrogen, $C_1$—$C_5$ alkyl or $C_1$—$C_5$ hydroxyalkyl, $B_1$ and $M_1$ each is phenylene, diphenylene, or phenylene, or diphenylene substituted by at most two members selected from alkyl, alkoxy, hydroxyalkoxy, alkoxyalkoxy, carboxyalkyl, carboxy, phenoxy, hydrogen or acylamino where acyl is selected from aliphatic carboxylic acid containing 1 to 5 carbon atoms, benzene carboxylic acid, pyridine carboxylic acid, furane carboxylic acid or thiophene carboxylic acid, halogen, alkylamino, sulfonic acid alkyl containing 1 to 5 carbon atoms, or sulfonyl, or naphthalene or naphthalene substituted by alkyl, or alkoxy and where $A_1$ and $K_1$ each contains from 1 to 3 carboxylic acid or sulfonic acid groups and where $B_1$ and $M_1$ each contains up to 2 carboxylic acid or sulfonic acid groups and $Y_1$ is a water solubility imparting bridging group selected from —($CH_2$)$_n$—, —CO—, —NH—, —O—, —S—, —S—S— and —$SO_2$— and $n$ is an integer having a value of at most 4.

2. Photographic material as claimed in claim 1 in which at least one layer contains a dyestuff of the formula

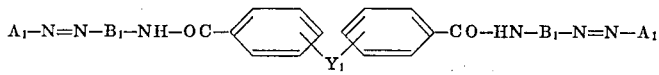

in which $A_1$, $B_1$ and $Y_1$ have the significance indicated in claim 1, at least the radical $A_1$ contains 1 to 3 carboxylic acid or sulfonic acid groups and/or the radical $B_1$ contains 1 to 2 carboxylic acid or sulfonic acid groups.

3. Photographic material as claimed in claim 1 in which at least one layer contains a dyestuff of the formula

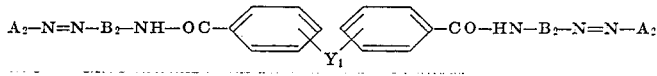

in which $A_2$ is phenyl, naphthyl, substituted phenyl and substituted naphthyl, the substitutents being selected from the group consisting of halogen, alkyl, alkoxy and nitro, and $A_2$ contains 1 to 3 sulfonic acid groups, $B_2$ is phenylene or phenylene substituted by at most two members selected from the group consisting of alkyl, alkoxy, hydroxyalkoxy, alkoxyalkoxy, carboxyalkyl, carboxy, phenoxy, halogen or acylamino, acyl being a member selected from the group consisting of an aliphatic carboxylic acid containing 1 to 5 carbon atoms, benzene, pyridine, furane or thiophene carboxylic acid, or $B_2$ is naphthalene substituted by alkyl, alkoxy and/or at most 2 sulfonic acid groups, and $Y_1$ has the significance indicated in clain 1.

4. Photographic material as claimed in claim 1 in which at least one layer contains a dyestuff of the formula

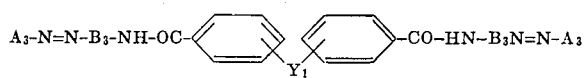

in which $A_3$ is phenyl, naphthyl, substituted phenyl and substituted naphthyl, the substituents being selected from the group consisting of halogen, alkyl containing 1 to 5 carbon atoms, alkoxy containing 1 to 5 carbon atoms and nitro, and $A_3$ contains 1 to 3 sulfonic acid groups, $B_3$ is phenylene, phenylene substituted by a member selected from the group consisting of alkyl containing 1 to 5 carbon atoms, alkoxy containing 1 to 5 carbon atoms, hydroxyalkoxy containing 1 to 5 carbon atoms, alkoxyalkoxy containing twice 1 to 5 carbon atoms, carboxyalkyl containing 1 to 5 carbon atoms, carboxy, phenoxy, halogen or acylamino, acyl being a member selected from the group consisting of an alkyl carboxylic acid containing 1 to 5 carbon atoms, benzene, pyridine, furane and thiophene carboxylic acid, or $B_3$ is naphthalene substituted by alkyl or alkoxy containing 1 to 5 carbon atoms and/or at most two sulfonic acid groups, and $Y_1$ has the significance indicated in claim 1.

5. Photographic material as claimed in claim 1 in which at least one layer contains a dyestuff of the formula

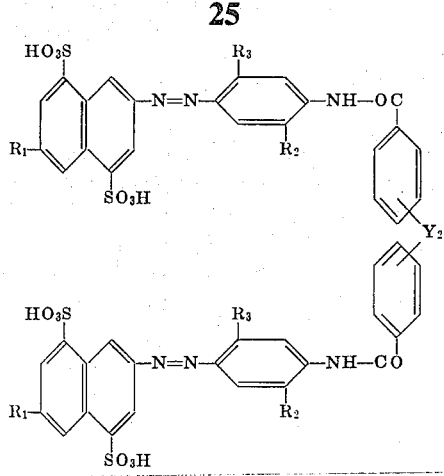

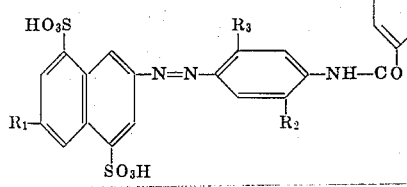

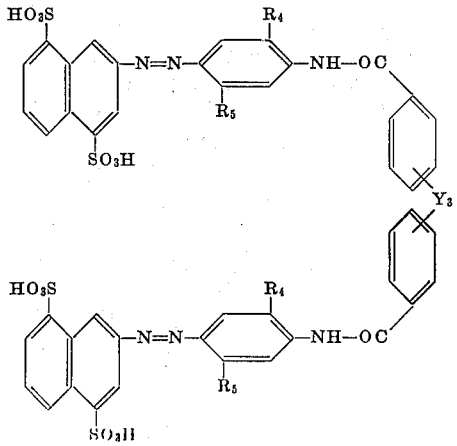

in which $R_1$ is hydrogen, nitro, halogen or sulfonyl, $R_2$ is hydrogen, halogen, alkyl containing 1 to 5 carbon atoms, alkoxy containing 1 to 5 carbon atoms, hydroxyalkoxy containing 1 to 5 carbon atoms, alkoxyalkoxy containing twice 1 to 5 carbon atoms, phenoxy or acylamino, $R_3$ is hydrogen, alkyl containing 1 to 5 carbon atoms, alkoxy containing 1 to 5 carbon atoms or acylamino, acyl in the acylamino groups of $R_2$ and $R_3$ being derived from alkyl carboxylic acid containing 1 to 5 carbon atoms, benzene carboxylic acid, pyridine carboxylic acid, furane or thiophene carboxylic acid, and $Y_2$ is a water solubility imparting bridging group selected from $-CH_2-$, $-NH-$, $-S-$, $-S-S-$ and $-SO_2$.

6. Photographic material as claimed in claim 1 in which at least one layer contains a dyestuff of the formula in which $R_4$ and $R_5$ each is hydrogen, chlorine, alkyl containing 1 or 2 carbon atoms, alkoxy containing 1 or 2 carbon atoms or alkylcarbonylamino containing 1 or 2 carbon atoms or in the alkyl radical and $Y_3$ is a water solubility imparting bridging group selected from $-SO_2-$, $-CH_2-$, $-S-$ and $-S-S-$.

7. Photographic material as claimed in claim 6 in which at least one layer contains a dyestuff of the formula

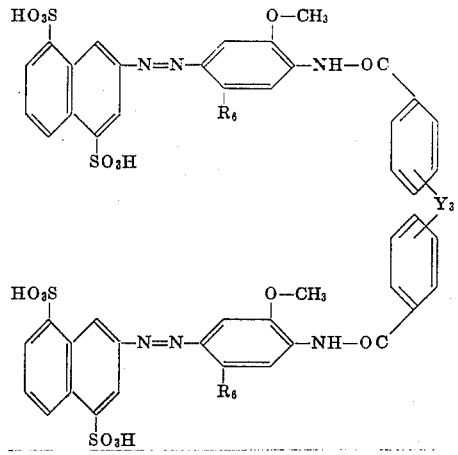

in which $R_6$ is chlorine, methyl, methoxy or acetylamino and $Y_3$ has the significance indicated in claim 6.

8. Photographic material as claimed in claim 1 in which at least one layer contains a dyestuff of the formula

in which $A_4$ is naphthalene substituted by at least one member selected from the group consisting of hydroxyl and a radical of the formula

in which $U_1$ is hydrogen, alkyl containing 1 to 5 carbon atoms, phenyl, alkylphenyl containing 1 to 5 carbon atoms in the alkyl radical, hydroxyalkyl containing 1 to 5 carbon atoms, cycloalkyl containing 5 or 6 ring carbon atoms or acyl derived from an alkyl carboxylic acid containing 1 1 to 5 carbon atoms, benzene, pyridine, furane or thiophene carboxylic acid, $U_2$ is hydrogen, alkyl containing 1 to 5 carbon atoms or hydroxyalkyl containing 1 to 5 carbon atoms, $B_4$ is benzene, naphthalene, diphenyl, substituted benzene, substituted naphthalene or substituted diphenyl radical, the substituents being selected from the group consisting of halogen, alkyl containing 1 to 5 carbon atoms or alkoxy containing 1 to 5 carbon atoms, $A_4$ and $B_4$ together contain 1 to 3 sulfonic acid groups, of which at most one is replaced by a sulfonic acid amide group, and $Y_1$ has the significance indicated in claim 1.

9. Photographic material as claimed in claim 1 in which at least one layer contains a dyestuff of the formula

in which $A_5$ is naphthalene which contains a sulfonic acid group and at least one member selected from the group consisting of a sulfonic amide group, at most 2 hydroxyl groups and a radical of the formula $-NH-U_3$ in which $U_3$ is hydrogen, alkyl containing 1 to 5 carbon atoms, phenyl or acyl derived from an alkyl carboxylic acid containing 1 to 5 carbon atoms, $B_5$ is benzene, diphenyl, substituted benzene or substituted diphenyl, the the substituents being halogen, sulfonic acid alkyl containing 1 to 5 carbon atoms or alkoxy containing 1 to 5 carbon atoms and $Y_2$ is —$CH_2$—, —NH—, —S—, —S—S— or —$SO_2$—.

10. Photographic material as claimed in claim 1 in which at least one layer contains a dyestuff of the formula

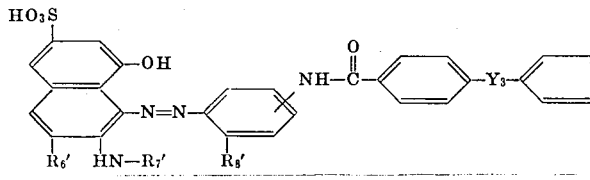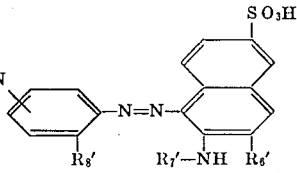

in which $R_6'$ is hydrogen or sulfonyl, $R_7'$ is hydrogen, alkyl containing 1 to 5 carbon atoms, benzene or benzene substituted by 1 to 3 methyl groups, $R_8'$ is hydrogen, halogen, alkyl containing 1 to 5 carbon atoms or sulfonyl and $Y_3$ is a water solubility imparting bridging group selected from —$SO_2$—, —$CH_2$—, —S— and —S—S—.

11. Photographic material as claimed in claim 1 in which at least one layer contains a dyestuff of the formula

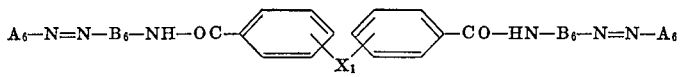

wherein $A_6$ is naphthalene which contains at most 2 sulfonic acid groups, at least one hydroxyl group and a radical of the formula —O—$U_4$ or —NH—$U_5$ in which $U_4$ is alkyl containing 1 to 5 carbon atoms or phenylalkyl containing 1 to 5 carbon atoms in the alkyl radical, and $U_5$ is hydrogen, alkyl containing 1 to 5 carbon atoms, hydroxyalkyl containing 1 to 5 carbon atoms, benzoylamino, dichloro-benzoylamino or p-toluenesulfonylamino; $B_6$ is benzene which is substituted by at least alkyl containing 1 to 5 carbon atoms, alkoxy containing 1 to 5 carbon atoms or acylamino, acyl being derived from an alkyl carboxylic acid having 1 to 5 carbon atoms, or $B_6$ is naphthalene which is substituted by at most 2 sulfonic acid group and hydroxyl and $Y_1$ has the significance indicated in claim 1.

12. Photographic material as claimed in claim 1 suitable for the silver dyestuff bleaching process.

13. Photographic material as claimed in claim 1, in which the dyestuff is in a layer also containing silver halide.

* * * * *

UNITED STATES PATENT OFFICE
CERTIFICATE OF CORRECTION

Patent No. 3,787,215        Dated January 22, 1974

Inventor(s)     Bernhard Piller

It is certified that error appears in the above-identified patent and that said Letters Patent are hereby corrected as shown below:

Col. 1, line 4, after "Switzerland" insert

-- assignors to CIBA-GEIGY AG, Basel, Switzerland --

Claim 8, Col. 26, line 42, delete "11" and substitute

-- 1 --.

Signed and sealed this 3rd day of December 1974.

(SEAL)
Attest:

McCOY M. GIBSON JR.
Attesting Officer

C. MARSHALL DANN
Commissioner of Patents